United States Patent [19]

Nishikawa

[11] Patent Number: 5,625,834
[45] Date of Patent: Apr. 29, 1997

[54] INFORMATION PROCESSING SECTION AND SYSTEM FOR OPERATING A PLURALITY OF VECTOR PIPELINE SETS IN TWO DIFFERENT MODES

[75] Inventor: Takeshi Nishikawa, Tokyo, Japan

[73] Assignee: NEC Corporation, Tokyo, Japan

[21] Appl. No.: 411,076

[22] Filed: Mar. 27, 1995

Related U.S. Application Data

[63] Continuation of Ser. No. 883,011, May 14, 1992, abandoned.

[30] Foreign Application Priority Data

May 14, 1991 [JP] Japan .................................. 3-107721

[51] Int. Cl.$^6$ ..................................... G06F 15/76
[52] U.S. Cl. ................. 395/800; 364/232.21; 364/232.9; 364/DIG. 1
[58] Field of Search ..................... 395/800, 375; 364/232.21, 232.9, DIG. 1

[56] References Cited

U.S. PATENT DOCUMENTS

| | | | |
|---|---|---|---|
| 4,777,593 | 10/1988 | Yoshida | 395/800 |
| 4,803,620 | 2/1989 | Inagami et al. | 395/375 |
| 5,239,654 | 8/1993 | Ing-Simmons et al. | 395/800 |
| 5,261,063 | 11/1993 | Kohn et al. | 395/375 |
| 5,355,508 | 10/1994 | Kan | 395/800 |
| 5,475,856 | 12/1995 | Kogge | 395/800 |

FOREIGN PATENT DOCUMENTS

| | | |
|---|---|---|
| 0195245 | 9/1986 | European Pat. Off. . |
| 0330386 | 8/1989 | European Pat. Off. . |
| 0402891 | 12/1990 | European Pat. Off. . |
| 2136172 | 9/1984 | United Kingdom . |

OTHER PUBLICATIONS

"The OPSILA Computer", M. Augin et al., *Parallel Algorithms & Architectures*, Cosnard et al. (Editors), Apr. 1986, pp. 143–153.

*Primary Examiner*—Alyssa H. Bowler
*Assistant Examiner*—John Harrity
*Attorney, Agent, or Firm*—Foley & Lardner

[57] ABSTRACT

In an information processing system of the present invention, a vector processor has a plurality of vector pipeline sets operable under control of an instruction controller. The vector pipeline sets are operable in a parallel mode or in an individual mode with reference to an operation mode flag kept in a mode flag register. The instruction controller includes a plurality of vector instruction control units which correspond to the respective vector pipeline sets and which monitor states of the vector instruction control units to detect whether or not an error has taken place in each of the vector instruction control units. The vector pipeline sets are connected to a vector data memory through a pipeline crossbar switch to fetch a common data signal from the vector data memory on demand.

1 Claim, 4 Drawing Sheets

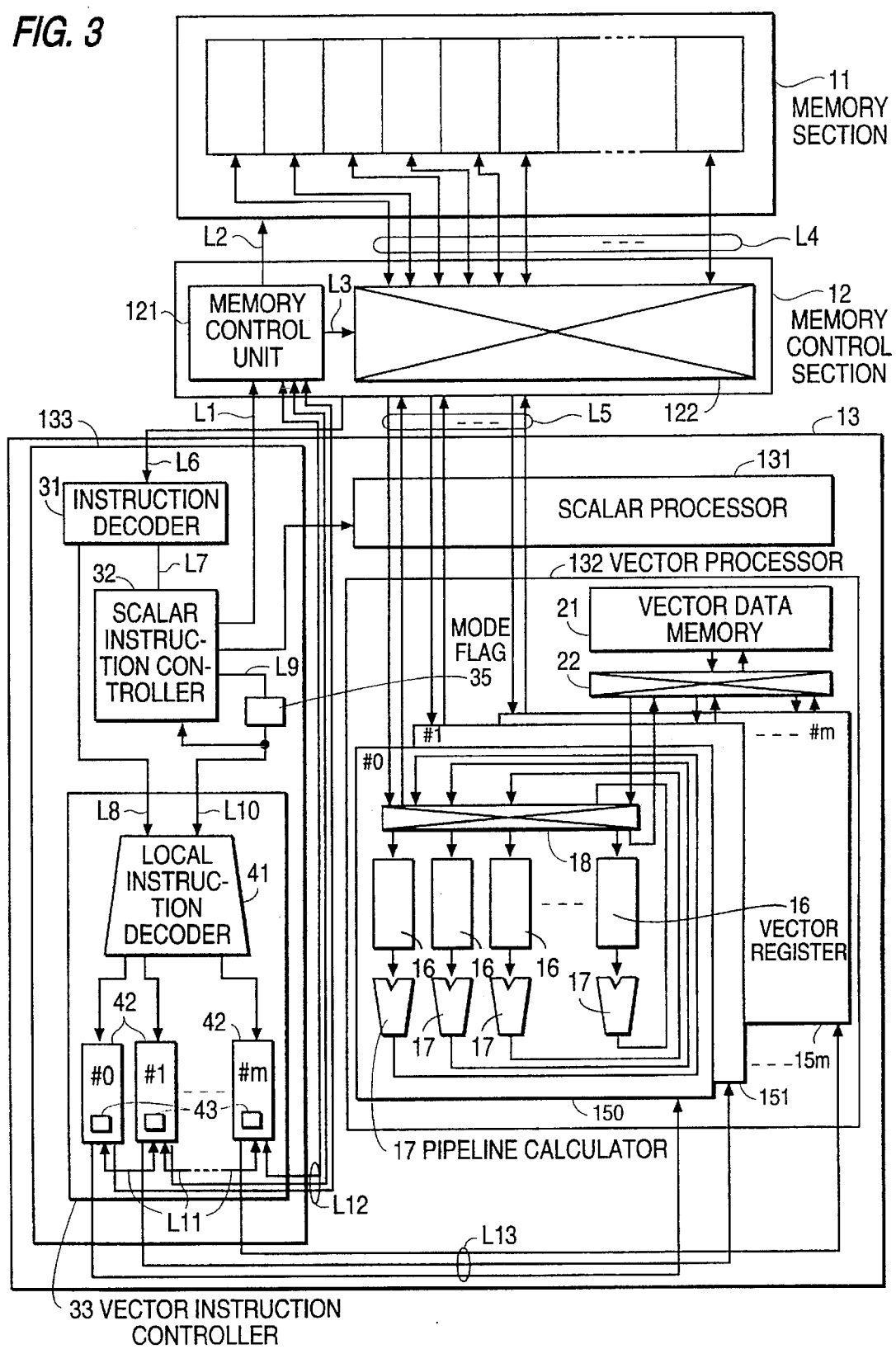

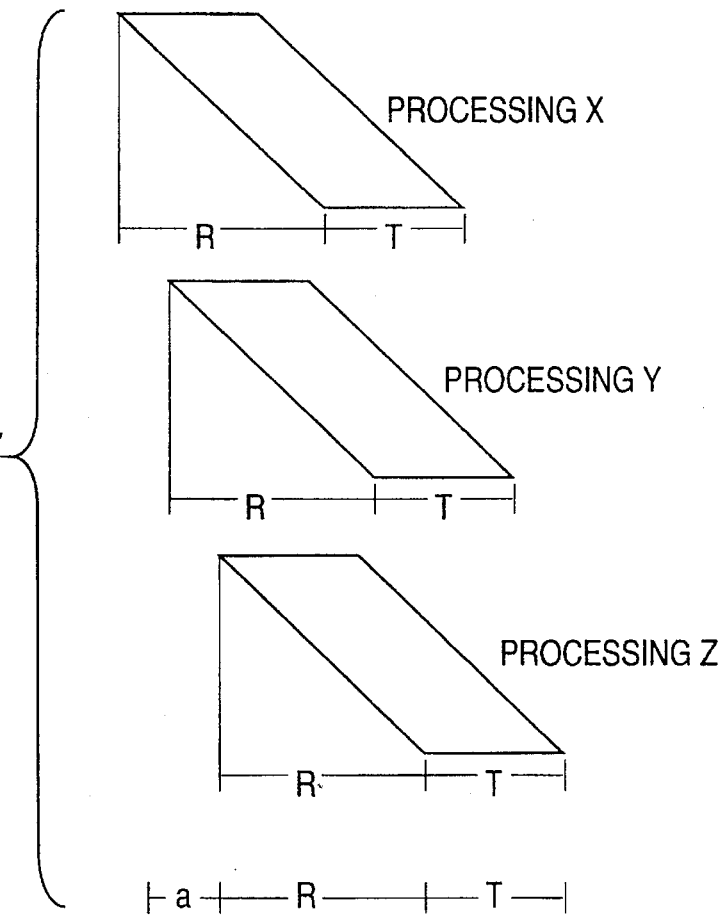

INFORMATION PROCESSING SECTION AND SYSTEM FOR OPERATING A PLURALITY OF VECTOR PIPELINE SETS IN TWO DIFFERENT MODES

This application is a continuation of application Ser. No. 07/883,011, filed May 14, 1992 now abandoned.

BACKGROUND OF THE INVENTION

This invention relates to an information processing system for use in processing a vector instruction in a pipeline fashion in addition to a scalar instruction.

A conventional information processing system of the type described comprises a processor section which cooperates with a memory section under control of a memory control section to process a sequence of instructions classified into scalar and vector instructions. In order to process such scalar and vector instructions, the processor comprises a scalar processing section for processing the scalar instructions together with scalar data signals and a vector processing section for processing the vector instructions together with vector data signals.

Furthermore, consideration has been made about effectively and quickly processing the vector instructions in a pipeline fashion. To this end, a proposal has been offered as regards an information processing system which comprises a plurality of vector pipeline sets in a vector processing section and which may be called a parallel-pipeline system hereinunder. In this event, each of the vector pipeline sets includes a plurality of vector registers for storing vector data signals and a plurality of pipeline calculators for carrying out vector calculations of the vector data signals stored in the vector registers. The parallel-pipeline system should comprise a vector processor unit for controlling the plurality of the vector pipeline sets by decoding the vector instructions and by delivering a control signal, namely, vector instruction information signals to the vector pipeline sets in response to each vector instruction.

More specifically, the vector processor unit is operable in response to each of the vector instructions to distribute a sequence of vector data signals or elements to the vector registers located within the plurality of the vector pipeline sets and to load the vector registers with the vector data signals. Such vector data signals are processed in parallel to one another to execute a specific one of the vector calculations in each vector pipeline set to which the vector data signals are distributed. In other words, the vector data signals or elements are equally distributed to the respective vector pipeline sets so as to always operate them in parallel.

With this structure, when the vector data signals or elements are very large in number, all the vector pipeline sets are effectively and equally operated or used for the specific vector calculation. However, when the number of the vector data elements is comparatively small for the specific vector calculation and when different vector calculations must be successively carried out after the specific vector calculation, idle or unused time intervals very often happen in each of the vector pipelines. This results in a reduction of utilization efficiency in hardware.

SUMMARY OF THE INVENTION

It is an object of this invention to provide an information processing system which is effectively capable of processing vector data elements in parallel.

It is another object of this invention to provide an information processing system of the type described, which can carry out different vector calculations in a short time, without idle time.

It is still another object of this invention to provide an information processing system of the type described, which is capable of flexibly using vector pipeline sets.

A processing section to which this invention is applicable is for use in an information processing system which comprises a memory section for storing data signals and a sequence of instructions and a memory control section for controlling the data signals and the instructions to deliver the data signals and the instructions between the processing section and the memory section. The data signals are classified into scalar and vector data signals while the instructions are also classified into scalar and vector instructions. The processing section comprises an instruction controller supplied with the instruction sequence through the memory control section for producing scalar and vector instruction information signals in response to the scalar and the vector instructions, respectively, a scalar processor for processing the scalar data signals when the scalar instruction information signals are produced from the instruction controller, and a vector processor for processing the vector data signals to produce a result signal representative of a result of processing when the vector instruction information signals are produced from the instruction controller. The vector processor comprises a plurality of vector pipeline sets for processing the vector data signals in a pipeline fashion in response to the vector information signals in cooperation with the memory control section.

According to this invention, the instructions include a mode instruction for operating the vector pipeline sets in a selected one of a first mode and a second mode different from the first mode. The instruction controller comprises mode indication means for operating the vector pipeline sets in parallel with and independently of one another when the first and the second modes are indicated by the mode instruction, respectively.

BRIEF DESCRIPTION OF THE DRAWING

FIG. 3 is a block diagram of an information processing system according to a preferred embodiment of this invention;

FIG. 4 is an instruction format used in the information processing system illustrated in FIG. 3; and FIG. 5 is a time chart for use in describing an operation which is executed by the information processing system illustrated in FIG. 3.

DESCRIPTION OF THE PREFERRED EMBODIMENTS

Figure 1:
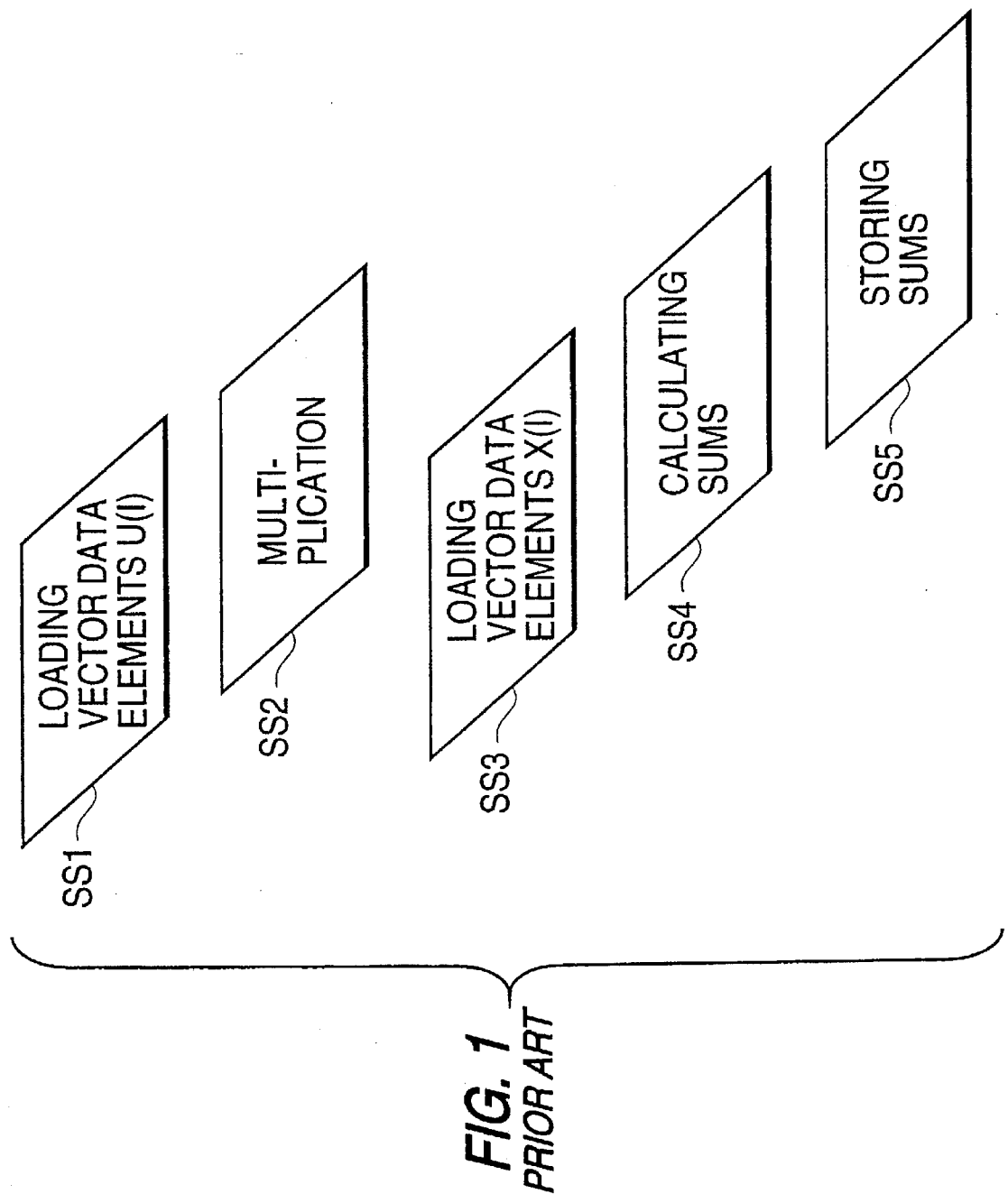
FIG. 1 is a diagram for describing a vector processing operation for a set of vector instructions in a conventional information processing system.

Referring to FIG. 1, description will be made about a conventional information processing system for a better understanding of this invention. At first, it is assumed that the information processing system comprises four sets of vector pipelines, namely, four vector pipeline sets, and successively carries out a vector processing operation defined by:

DO 100 I=1, 64

$X(I)=X(I)+S*U(I)$ $Y(I)=Y(I)+S*V(I)$ $Z(I)=Z(I)+S*W(I)$

100 CONTINUE

The above vector processing operation will be referred to as a particular vector processing operation.

In this connection, the four vector pipeline sets will be called zeroth through third vector pipeline sets.

The above-mentioned particular vector processing operation is for successively calculating determinants as regards each of vector variables X, Y, and Z. In the example mentioned above, the vector processing operation is successively executed in connection with each variable X, Y, and Z by carrying out an inner loop composed of first through fifth steps which are executed at every one of the vector variables X, Y, and Z, as will be described below. Therefore, the vector processing operation will be described as regards the first through the fifth steps carried out as regards only the vector variable X. Herein, it is to be noted that each vector pipeline set comprises a plurality of vector registers and a plurality of vector pipeline calculators, as known in the art.

At the first step SS1, either one of the vector registers is loaded as a multiplicand with the vector data element U(I) from a memory section in a known manner. The vector data element U(I) is multiplied at the second step SS2 by a scalar variable or parameter S which is stored in a scalar register to calculate a multiplication result. At the third step SS3, the vector data element X(I) is read out of the memory section and loaded in the vector register. At the fourth step SS4, the multiplication result calculated at the second step SS2 is added to the vector data element X(I) loaded at the third step SS3 to calculate a sum of the multiplication result and the vector data element X(I). The sum is stored in the memory section at the fifth step SS5.

More particularly, the number of each of the vector data elements X(I) and U(I) is assigned to each of the zeroth through the third vector pipeline sets and is equal to sixty-four. Therefore, the zeroth vector pipeline set is given the sixty-four vector elements numbered as 0, 4, 8, ..., 252, while the first vector pipeline set is given the vector elements numbered as 1, 5, 9, ..., 253. Likewise, the second and the third vector pipeline sets are given the vector elements of 2, 6, 10, ..., 254, and the vector elements 3, 7, 11, ..., 255, respectively.

From this fact, it is readily understood that the vector registers of the zeroth through the third vector pipeline sets are at first loaded with a set of the vector elements X(0), X(1), X(2), and X(3), respectively, and are thereafter loaded with X(4), X(5), X(6), and X(7), respectively.

In FIG. 1, the vector registers of the zeroth through the third vector pipeline sets are loaded with the vector elements U(I) at the first step SS1. Likewise, the vector registers of the zeroth through the third vector pipeline sets are also loaded with the vector elements X(I) in a manner similar to the vector elements U(I), as shown at the third step SS3.

At the second step SS2, the vector elements U(I) loaded in the vector registers of the zeroth through the third vector pipeline sets are concurrently multiplied by the scalar data element S in the respective vector pipeline sets to obtain multiplication results. The multiplication results are stored in the vector registers of the zeroth through the third vector pipeline sets, respectively. Specifically, the multiplication results are assigned to locations of the respective vector registers determined in relation to the vector data element numbers. As mentioned before, the third step SS3 is executed to store the vector elements X(I) into the vector registers in the above-mentioned manner while multiplications are being calculated at the second step SS2. The fourth step SS4 is started to calculate the sums of the vector elements X(I) and the multiplication results when the multiplication results are calculated, and the vector elements X(I) are loaded in the vector registers at the third step SS3. The sums are stored in the memory at the fifth step SS5 as vector sum elements. On storing the vector sum elements sent from the respective vector pipeline sets, the vector sum elements are rearranged into consecutive numbered elements.

Similar operations are carried out to calculate the other vector elements Y(I) and Z(I).

Figure 2:
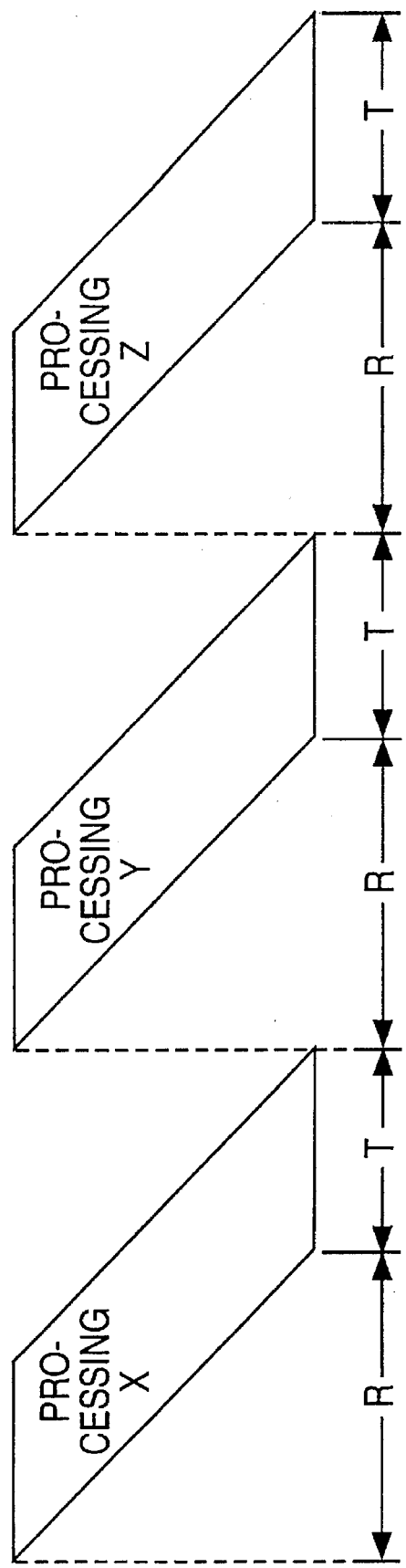
FIG. 2 is a time chart for use in describing a sequence of vector processing operations executed by a plurality of sets of the vector instructions.

Referring to FIG. 2, the vector variables X, Y, and Z are successively processed within first through third execution times in the illustrated manner. As shown in FIG. 2, each of the first through the third execution times is divided into a rise up time R and a throughput time T. If the rise up time R and the throughput time T for each vector variable are equal to the rise up times R and the throughput times T for the other variables, a sum total of the execution times become equal to a sum of 3R and 3T, and will be called a total processing time T1 hereinunder.

The conventional information processing system is disadvantageous as pointed out in the preamble of the instant specification. For example, first through N-th vector calculations are assumed to be executed by the use of zeroth through m-th vector pipeline sets in the conventional manner. In this event, the total processing time T1 is given by:

$$T1=(R+[n/m]*t)*N, \quad (1)$$

where t is representative of the number of reference clocks; n, the number of the vector elements; and [n/m], an integer obtained by rounding up the first place of the decimals.

In Equation (1), when the number n of the vector elements is assumed to be extremely large, the rise up time R is negligibly small in comparison with the term of n*t. However, when the number n is small, most of each execution time is occupied by the rise up time R.

On the other hand, efforts have been exerted to reduce the number t of the reference clocks in order to improve on operation speed. However, such efforts are not so effective to decrease the term of n*t. It has been found out that the rise up time R is strongly dependent on a spacial area of the system.

Referring to FIG. 3, an information processing system according to a preferred embodiment of this invention comprises a memory section 11, a memory control section 12, and a processor section 13 which is operable to process vector data elements at a high speed, in a manner to be described later in detail.

In FIG. 3, the memory section 11 is composed of a plurality of banks which enable a high speed access in consideration of an operation speed of the processor section 13. With this structure, it is possible to compensate for a difference between a machine cycle of the processor section 13 and a cycle time of each memory element included in the memory section 11 by the use of an interleave technique.

The illustrated memory control section 12 comprises a memory control unit 121 and a memory crossbar switch 122. The memory control unit 121 is connected to the processor section 13 through a signal line L1 to monitor or supervise the banks and the memory crossbar switch 122. To this end, the memory control unit 121 is connected through signal lines L2 and L3 to the memory section 11 and the memory crossbar switch 122, respectively. Specifically, the memory control unit 121 is supplied with a request code to deliver unit control signals to the memory section 11 and the memory crossbar switch 122 through the signal lines L2 and L3, respectively.

On the other hand, the memory crossbar unit 122 is connected to the banks and the processor section 13 through signal line groups L4 and L5, respectively and is selectively operable in a load or readout mode and a storage mode.

During the load mode, the memory crossbar switch 122 is supplied from the banks with data signals through the signal line group L4 and rearranges the data signals into rearranged data signals in response to the unit control signals sent from the memory control unit 121. The rearranged data signals are delivered through the signal line group L5 to the processor section 13. On the other hand, the memory crossbar switch 122 receives data signals from the processor section 13 through the signal line group L5 during the storage mode to deliver the data signals through the signal line group L4 to the banks in response to the unit control signals. As a result, the data signals are memorized in addresses of the banks to be stored. Herein, it is to be noted that the data signals are classified into scalar and vector data signals while the instructions are also classified into scalar and vector instructions.

Now, the processor section 13 comprises a scalar processor 131 for processing the scalar data signals in accordance with the scalar instructions, a vector processor 132 for processing the vector data signals in accordance with the vector instructions, and an instruction controller 133 supplied from the memory section 11 with the instructions to manage hardware resources and to produce instruction control signals, namely, scalar and vector instruction information signals.

As known in the art, the scalar processor 131 comprises general purpose registers for storing control parameters and address parameters in addition to the scalar data signals for scalar processing. Furthermore, a fixed point arithmetic unit, a floating point arithmetic unit, a logical unit, and so on are included in the scalar processor 131 to carry out an address calculation, an index calculation, and a control parameter calculation.

In the example being illustrated, the vector processor 132 comprises zeroth through m-th vector pipeline sets 150 to 15 m each of which comprises a plurality of vector registers (collectively depicted at 16) for storing the vector data signals or elements, a plurality of pipeline calculators 17 connected to the vector registers 16, and a pipeline crossbar switch 18 for transferring the vector data signals among vector pipelines of each set, as exemplified in the zeroth vector pipeline set 150. In addition, the zeroth through the m-th vector pipeline sets 150 to 15 m are connected to a vector data memory 21 through an additional pipeline crossbar switch 22.

As will be described later in detail, the zeroth through the m-th vector pipeline sets 150 to 15 m can be operated in parallel or individually. In other words, each vector pipeline set 150 to 15 m is selectively operable in a parallel mode or an individual mode which may be called first and second modes, respectively. The individual mode may be often referred to as an independent mode.

With this structure, it is possible to access the vector data memory 21 from every one of the zeroth through the m-th vector pipeline sets 150 to 15 m.

Furthermore, the instruction controller 133 comprises an instruction decoder 31 connected to the memory control section 12 through a signal line L6, a scalar instruction controller 32 connected to the instruction decoder 31 through a signal line L7, and a vector instruction controller 33 connected to the instruction decoder 31 through a signal line L8. The instruction decoder 31 is supplied from the memory section 11 through the signal line L6 with an input instruction to decode the input instruction into a decoded instruction and to judge whether the decoded instruction is processed by the scalar instruction controller 32 or the vector instruction controller 33. When the decoded instruction is processed by the scalar instruction controller 32, the decoded instruction is delivered to the scalar instruction controller 32 and, otherwise, the decoded instruction is delivered to the vector instruction controller 33.

Briefly, each of the scalar and the vector instruction controllers 32 and 33 is operable to administrate states of hardware resources, such as registers, arithmetic units, data buses, included in each processor 131 and 132, to collate states of the hardware resources required by each input instruction with practical states administrated by each controller 32 and 33, and to carry out a control operation such that each of the hardware resources is energized after a busy state is released when each resource is put into the busy state.

The illustrated scalar instruction controller 32 also processes control instructions for controlling a whole of the system in addition to control of the scalar processor 131. Moreover, the scalar instruction controller 32 is connected to a mode flag register 35 which stores a mode flag representative of whether the zeroth through the m-th vector pipeline sets are operated in the individual mode or the parallel mode. In this connection, the mode flag may be referred to as an operation mode flag. The operation mode flag is set or reset by a specific one of the control instructions sent from the scalar instruction controller through a signal line L9. In the illustrated example, it is assumed that the zeroth through the m-th vector pipeline sets 150 to 15 m are operated in the individual mode when the operation mode flag is put into a set state and, otherwise, they are operated in the parallel mode.

In the illustrated vector instruction controller 33, a local instruction decoder 41 is connected to the instruction decoder 31 and the mode flag register 35 through the signal line L8 and a signal line L10, respectively. The local instruction decoder 41 is also connected to zeroth through m-th vector instruction control units 420 to 42 m which correspond to the zeroth through the m-th vector pipeline sets 150 to 15 m, respectively.

When the operation mode flag is put into the reset state to indicate the parallel mode, the local instruction decoder 41 supplies all of the vector instruction control units 420 to 42 m with the vector instruction information signals sent from the instruction decoder 31. Consequently, the vector instruction information signals are set into the vector instruction control units 420 to 42 m.

On the other hand, when the operation mode flag is put into the set state to indicate the individual mode, a selected one of the vector instruction control units is indicated by a vector pipeline set indication signal sent from the instruction decoder 31 and is supplied with the vector control information signal through the local instruction decoder 41.

Each of the vector instruction control units 420 to 42 m comprises a vector length register 43 which serves to define an operation of the corresponding vector pipeline set. The zeroth through the m-th vector instruction control units 420 to 42 m are connected to one another through signal lines L11 to monitor or check control information signals to one another, and are connected to the memory control unit 121 through a signal line group L12.

Referring to FIG. 4, exemplification is made about an instruction which is used in the information processing system illustrated in FIG. 3 and which has an operation code field OP for an operation code and an address field which is divided into first, second, and third fields x, y, and z. The first field x includes a vector pipeline set indication field Cx and an operation result storage register indication field Vx, while the second field y includes a calculation data register indication field Vy. The third field z includes a vector data memory control field Cz and a vector data register indication field Vz.

Specifically, the vector pipeline set indication field Cx serves to indicate the vector pipeline sets which execute the instruction in the individual mode. Therefore, the vector pipeline set indication field Cx is used to indicate the vector pipeline sets when the operation mode flag is set. The operation result storage register indication field Vx and the calculation data register indication field Vy serve to indicate the vector registers which are included in the vector pipeline set and which are used by the instruction. The vector data memory control field Cz is for determining whether or not the vector data memory 131 is used by the instruction in question. For instance, when this field Cz is set into a logic "1" level, the vector data memory 131 is used and, otherwise, the vector data memory 131 is not used. The vector data register indication field Vz indicates the vector data memory number used by the instruction when the control field Cz is set into the logic "1" level. The other fields will not be described because they operate the same irrespective of the present invention.

Herein, it should be noted that the illustrated information processing system is operable in a manner similar to the conventional information processing system when the operation mode flag is put into the reset state to indicate the parallel mode because all of the vector pipeline sets are concurrently operated in parallel with one another. Accordingly, description will not be made about the parallel mode but only about the individual mode.

Referring back to FIG. 3, the first through the m-th vector instruction control units 420 to 42 m are included in the vector instruction controller 33 so as to individually operate the zeroth through the m-th vector pipeline sets 150 to 15 m. This is different from the conventional information processing system which comprises a single set of a vector instruction control unit alone so as to carry out operation in the parallel mode alone.

When the zeroth through the m-th vector instruction control units 420 to 42 m are included in the vector instruction controller 33 and are operable independently of one another, a fault or an error might individually occur in each of the zeroth through the m-th vector instruction control units 420 to 42 m. Such a faulty vector instruction control unit might be operated in a manner different from the others. Under the circumstances, a faulty vector instruction control unit should be correctly detected. To this end, the vector instruction control units 420 to 42 m are monitored one another by exchanging specific information or control signals which are sent to each vector pipeline set through the signal line L11. With this structure, it is possible to detect occurrence of an error or a fault in the parallel mode by monitoring production of a different one of the specific control signals from one of the vector instruction control units which are to be operated at the same timing. The signal line L11 serves to detect the fault in each of the vector instruction control units 420 to 42 m.

Now, description will be made about the individual mode which is executed by putting the operation mode flag into the set state. Herein, let a particular vector processing operation as mentioned in conjunction with FIG. 2 be executed in the information processing system illustrated in FIG. 3. At any rate, the particular vector processing operation is representative of a sum of products of the three vector variables X(I), Y(I), and Z(I).

In order to execute such a particular vector processing operation in the individual or independent mode according to the present invention, a sequence of instructions is produced by a compiler and is described at an assembler level, as will be exemplified hereinunder.

| PARSET | S |
|---|---|
| LVL(0) | S0 |
| VLD(0) | VR0 |
| VFMP(0) | VR1, S10, VR0 |
| VLD(0) | VR2 |
| VFAD(0) | VR3, VR1, VR2 |
| VST(0) | VR3 |
| VLD(1) | VR0 |
| VFMP(1) | VR1, S10, VR0 |
| VLD(1) | VR2 |
| VFAD(1) | VR3, VR1, VR2 |
| VST(1) | VR3 |
| VLD(2) | VR0 |
| VFMP(2) | VR1, S10, VR0 |
| VLD(2) | VR2 |
| VFAD(2) | VR3, VR1, VR2 |
| VST(2) | VR3 |

In the above instruction sequence, the instruction PARSET is for designating either one of the parallel mode and the individual mode and puts the operation mode flag into the set state and the reset state when a first operand bears "S" and "R", respectively. In the example, the operation mode flag is set in the mode flag register 35 to execute the vector processor 132 in the individual mode, as mentioned above.

The instruction LVL(n) S0, as shown in the second row, defines to load a content of a zeroth one of the scalar registers 60 into the vector length register 43 (suffix omitted) of an n-th one of the vector instruction control units 42. In addition, the instruction VLD(n) is for loading a vector data signal stored in the n-th vector pipeline set while the instruction VFMP(n) indicates a floating point multiplication of vector data signals in the n-th vector pipeline set. Likewise, the instructions VFAD(n) and VST(n) indicate a floating point addition of vector data signals and a storage of vector data signals, respectively, in the n-th vector pipeline set. Such instructions are similar to conventional instructions except that each of the former instructions has an indication field, such as Cx in FIG. 4, indicative of one of the vector pipeline sets that is operated in the individual mode.

Taking the above into consideration, the particular vector processing operation is assumed to be executed in accordance with the above-mentioned instruction sequence. At first, the instruction PARSET S is read out of the memory section 11 to be sent to the instruction decoder 31 of the instruction controller 133 through the signal line L6. Supplied with the instruction PARSET S, the instruction decoder 133 judges that the instruction PARSET S is a specific scalar instruction for putting the mode flag register 35 into the set state of the logic "1" level. Consequently, the instruction decoder 31 delivers the instruction PARSET S to the scalar instruction controller 32 through the signal line L7. The scalar instruction controller 32 puts the mode flag register 35 into the set state through the signal line L9. Thus, the operation mode flag is set to individually control the vector pipeline sets in the following vector processing.

Subsequently, the next instruction LVL(0) S0 is decoded by the instruction decoder 31 into the corresponding vector instruction information signals which are transferred through the signal line L8 to the local instruction decoder 41 of the vector instruction controller 33 which is given the operation mode flag of the logic "1" level through the signal line L10. Supplied with the operation mode flag of the logic "1" level and the instruction LVL(0) S0, the local instruction decoder 41 detects the individual mode from the operation mode flag of the logic "1" level and sets a content of the scalar register S0 into the vector length register 430 of the zeroth vector instruction control unit 420 indicated by pipeline indication information "0" of the instruction LVL (0). Thus, the vector length register 430 keeps the content of the scalar register S0 as a vector length until the vector length is renewed by the next LVL(0) instruction and, as a result, the zeroth vector pipeline set 150 executes the vector processing operation in accordance with the vector length set in the vector length register 430.

Likewise, the instruction decoder 31 successively decodes the instructions VLD(0), VFMP(0), VLD(0), VFAT(0), and VST(0) to send decoded instructions, namely, the vector instruction information signals to the vector instruction controller 33 through the signal line L8. The vector instruction controller 33 judges that the operation mode flag indicates the individual mode and that the above instructions indicate the zeroth vector instruction control unit 420. Consequently, the instruction information signals are set and kept in the zeroth vector instruction control unit 420.

In the meanwhile, the zeroth through the m-th vector instruction control units 420 to 42 m are connected to the zeroth through the m-th vector pipeline sets 150 to 15 m through a signal line group L13, respectively, as illustrated in FIG. 3.

In the illustrated example, the zeroth vector instruction control unit 420 administrates states of hardware resources included in the zeroth vector pipeline set 150 to supply the zeroth vector pipeline set 150 with an execution start signal together with control information signals, if received instructions use the zeroth vector pipeline set 150 and the hardware resources of the zeroth pipeline set 150 are put into operable states.

Supplied with the execution start signal, the zeroth vector pipeline set 150 carries out a processing operation in accordance with the control information signals sent together with the execution start signal, independently of the other vector pipeline sets.

On the other hand, if the received instructions specify a memory access instruction, a request information signal, namely, a request code which includes the vector pipeline set operation mode flag and the vector pipeline set indication signal is transmitted to the memory control section 12 through the signal line L12 after hardware resources of the zeroth vector pipeline set are put into transmissible states. Responsive to the request information signal, the memory control unit 121 judges the individual mode from the operation mode flag included in the request information signal and also judges the zeroth vector pipeline set 150 as an access object from the vector pipeline set indication signal. In the above-mentioned instruction sequence, when the instruction VLD(0) of the third row is executed, the memory crossbar switch 122 is controlled so that all of the vector data signals fetched from the memory section 11 are successively sent to the vector registers of the zeroth vector pipeline set 150 in the form of rearranged data signals.

Going abreast of execution of the above-mentioned instructions, the instruction controller 133 successively receives and decodes the next following instruction sequence, such as LVL(1), VLAD(1), and so on, in a similar manner. The next following instruction sequence as exemplified above is for operating the first vector pipeline set 151 and is transferred to the vector instruction controller 33 in the form of instruction information signals. The instruction information signals are set into the first vector instruction control unit 421 in accordance with the vector pipeline set indication signal. The first vector instruction control unit 421 manages states of hardware resources included in the first vector pipeline set 151 to issue an execution indication of an executive instruction to the first vector pipeline set 151.

In a similar manner, another instruction sequence, such as LVL(2), VLD(2), is set into the second vector instruction control unit 422 to be successively processed therein. At any rate, each operation in the zeroth through the second vector pipeline sets 150 to 152 can be executed in the manner illustrated in FIG. 1.

Practically, each instruction sequence for the zeroth through the second vector pipeline sets 150 to 152 is processed in synchronism with the machine cycle in a pipeline fashion within each of the zeroth through the second vector pipeline sets 150 to 152.

Herein, it is possible to deliver each of the instruction sequences from the instruction decoder 133 to the corresponding vector instruction control units in substantial parallel with one another.

Referring to FIG. 5, the zeroth through the second vector pipeline sets 150 to 152 can carry out the processing operation related to the variables X(I), Y(I), and Z(I) in substantial parallelism with one another. In FIG. 5, a total processing time T2 is represented by a sum of a rise up time R, a throughput time T, and an overhead time a necessary for raising up a data set of each variable Y(I) and Z(I).

Let first, second, and third processings be executed by the use of a common variable or parameter P(I). In this event, the common variable P(I) may be previously read out of the memory section 11 and stored in the vector data memory 21 to be loaded into each vector pipeline set from the vector data memory 21 through the pipeline crossbar switch 22 each time when the common variable P(I) is used in each of the first through the third processings.

For example, such common use of the variable P(I) is very effective to carry out the first through the third processings depicted at A, B, and C as follows.

DO 10 I=1, S $$X(I)=X(I)+P(I)*U(I) \qquad (A)$$
$$Y(I)=Y(I)+P(I)*V(I) \qquad (B)$$
$$Z(I)=Z(I)+P(I)*W(I) \qquad (C)$$

10 CONTINUE

With this structure, it is possible to shorten an overhead time a in comparison with the conventional information processing system wherein a common memory is used for delivery of such a common variable among tasks. This is because a rise up time for load/storage operation becomes short.

As mentioned before, the information processing system according to this invention can individually or independently operate each vector pipeline set. Therefore, the total processing time T2 of this invention is given by:

$$T2=((s+n*t)*N)/m, \qquad (2)$$

where s is representative of a rise up time of each vector operation; n, the number of vector data elements; t, the number of the reference clocks; m, the number of the pipelines; and N, the number of the vector calculations.

When Equations (1) and (2) are compared with each other, a difference between the total processing times T1 and T2 is given by:

$$T1-T2=N*s*(1-1/m). \quad (3)$$

From Equation (2), it is readily understood that the present invention enables a reduction of the total processing time as compared with the conventional information processing system.

In addition, a multi-task operation can be accomplished in parallel with one another with a small overhead time when each task has a small number of vector elements.

While this invention has thus far been described in conjunction with a preferred embodiment thereof, it will readily be possible for those skilled in the art to put this invention into practice in various other manners. For example, it is possible to carry out any other vector calculations except the particular vector calculation.

What is claimed is:

1. An information processing system, comprising:

a memory section for storing data signals and a sequence of instructions, a processing section for processing said data signals in accordance with said instructions, and a memory control section for controlling said data signals and said instructions to deliver said data signals and said instructions between said processing section and said memory section; and wherein said data signals are classified into scalar and vector data signals and said instructions are classified into scalar and vector instructions;

said processing section comprising:

an instruction controller supplied with said instruction sequence through said memory control section for producing scalar and vector instruction information signals in response to said scalar and said vector instructions, respectively;

a vector data memory;

a scalar processor for processing the scalar data signals when said scalar instruction information signals are produced from said instruction controller; and a vector processor for processing the vector data signals to produce a result signal representative of a result of processing when said vector instruction information signals are produced from said instruction controller;

said vector processor comprising a plurality of vector pipeline sets for processing the vector data signals in a pipeline fashion in response to said vector information signals in cooperation with said memory control section;

said instructions including a mode instruction for selectively operating said vector pipeline sets in a first mode wherein said plurality of vector pipeline sets execute an operation in parallel with one another and a second mode which is different from said first mode wherein said plurality of vector pipeline sets execute different operations independently of one another;

said instruction controller including, mode indication means for selectively operating said plurality of vector pipeline sets in parallel with and independently of one another when said first and said second modes are indicated by said mode instruction, respectively;

a vector instruction controller producing vector control signals according to said vector instruction information signals received from said instruction decoder, said vector instruction controller including, a local instruction decoder configured to provide said vector instruction information signals to said vector processor; and a plurality of vector instruction control units each connected to said local instruction decoder and to a corresponding one of said vector pipeline sets, wherein in said first mode, said local instruction decoder supplies all of said vector instruction control units with said vector instruction information signals, and in the second mode, a selected one of said vector instruction control units is supplied with said vector information signals, and wherein each of said vector instruction control units includes a vector length register used to define an operation to be performed by a corresponding one of said vector pipeline sets, wherein each of said scalar instructions and vector instructions comprises:

an op code field for specifying an operation code of said vector instructions and scalar instructions; and an address field including a first, second and third field, said first field including a vector pipeline set indication field and an operation result storage register indication field, said second field including a calculation data register field, and said third field including a vector data memory control field and a vector data register indication field, wherein said vector pipeline set indication field indicates which of said vector pipeline sets are to be used when executing said vector instructions in the first mode, said operation result storage register indication field indicating which of said vector registers of a selected one of said vector pipeline sets are to be used for storing an operation result when executing said vector instructions, and said vector data memory control field indicating whether said vector data memory is to be used when executing said vector instructions.

* * * * *